United States Patent [19]

Miessen et al.

[11] 4,017,561

[45] Apr. 12, 1977

[54] WET SPUN MODACRYLIC FILAMENTS WITH IMPROVED COLORISTIC PROPERTIES

[75] Inventors: Ralf Miessen, Dormagen; Günter Blankenstein, Stommeln; Siegfried Korte, Leverkusen; Carlhans Süling, Odenthal-Hahnenberg, all of Germany

[73] Assignee: Bayer Aktiengesellschaft, Leverkusen, Germany

[22] Filed: Nov. 11, 1975

[21] Appl. No.: 630,776

[30] Foreign Application Priority Data

Nov. 15, 1974 Germany .......................... 2454323

[52] U.S. Cl. .............................. 260/898; 264/182; 264/290 R; 264/210 F
[51] Int. Cl.² ........................................ C08L 33/20
[58] Field of Search ................................... 260/898

[56] References Cited

UNITED STATES PATENTS

| | | | |
|---|---|---|---|
| 2,861,101 | 11/1958 | Tousignant et al. | 260/513 |
| 2,949,437 | 8/1960 | Hobson | 260/45.5 |
| 3,139,621 | 6/1964 | Stewart | 260/41 |
| 3,287,304 | 11/1966 | Fujisaki et al. | 260/29.6 |
| 3,507,823 | 4/1970 | Trapasso et al. | 260/32.6 |

FOREIGN PATENTS OR APPLICATIONS 1,121,247 7/1968 United Kingdom ............... 260/898

*Primary Examiner*—Carman J. Seccuro
*Attorney, Agent, or Firm*—Plumley and Tyner

[57] ABSTRACT

The invention relates to wet-spun modacrylic filaments with improved coloristic properties based on a polymer mixture, which comprises at least one acrylonitrilevinyl chloride copolymer and a chlorine-containing copolymer containing sulphonic acid ester groups or sulphuric acid ester groups.

5 Claims, No Drawings

WET SPUN MODACRYLIC FILAMENTS WITH IMPROVED COLORISTIC PROPERTIES

It is known that the coloristic properties of synthetic fibers can be improved by the incorporation of dye-receptive groups. To this end, the starting material from which the fibers are produced is modified by using special starter systems or by incorporating comonomers having dye-receptive groups, or alternatively polymer mixtures, in which one component contains the dye-receptive groups in increased concentrations, are used as the starting material for the fibers. According to Japanese Pat. Specification No. 35-22478/1960, $-SO_3^-$ or $-O-SO_3^-$—groups are formed as terminal groups during copolymerisation, for example by using a redox system based on ammonium persulphate/dihydroxy maleic acid and iron(II)sulphate Terminal groups of this kind provide the starting material for fibers having a special affinity for basic dyes. One disadvantage of this process is that only relatively small quantities of dye-receptive groups can be incorporated in the starting material, in addition to which the fibers cannot be dyed deep shades with basic dyes. In addition, minor fluctuations in the conditions under which the starting material for the fibers is produced, i.e. for example during polymerisation result in significant changes in the molecular weight distribution and, hence, in changes in the dyeing properties of the fibers owing to the change in the number of terminal groups.

In addition, it is known from Canadian Pat. Specification No. 704,778 that starting polymers for modacrylic fibers and modacrylic filaments with improved coloristic properties can be produced by the polymerisation in aqueous emulsion of acrylonitrile, vinyl chloride and such compounds as N-acryloyl dimethyl taurine. One disadvantage of the process described in Canadian Pat. Specification No. 704,778 is that the copolymerisation can only be carried out up to a 50% conversion of the comonomers used. In contrast to the readily volatile and substantially water-insoluble comonomers, vinyl chloride or acrylonitrile, the readily water-soluble involatile comonomers containing sulphonic acid groups can only be recovered from the reaction medium on completion of polymerisation by a highly elaborate process. Under the conditions of Canadian Pat. Specification No. 704,778, the incorporation rate of the comonomers, such as acryloyl dimethyl taurine and methacryloyl taurine, is governed by the conversion level. Thus a fiber starting material with constant coloristic properties can only be obtained with considerable outlay by specifically displacing and controlling the reaction.

In addition, it is known from US-PS 3,113,122 that the affinity for dyes of acrylic of modacrylic filaments can be improved by the addition of copolymers. In this process, the actual fiber starting material, which contains at least 35% of copolymerised acrylonitrile, is mixed with up to 20% of a copolymer of 60 to 95% of 2-cyanoethyl-(meth)-acrylate and 5 to 40% of a $C_1$ to $C_{12}$-alkyl acrylate or $C_1$ to $C_{12}$-alkyl methacrylate. One disadvantage of the fiber material obtained by this process is that, in general, only the rate of absorption of dyes is increased by an additive which, under the dyeing conditions, acts as a plasticiser and, hence, loosens, the structure of the fibers. It is not possible in this way to increase dye saturation. In other words, although the maximum depth of colour can be reached relatively quickly during dyeing, the addition is unable to increase the maximum dye absorption because, as is generally known, the maximum quantity of basic or acid dyes which can be taken up is determined by the total number of acceptor groups present. In the case of basic dyes, therefore, it is the concentration of acid groups in the fiber starting material which determines the maximum dye absorption. Furthermore, the addition of plasticising additives to the fiber starting material, especially in the case of modacrylic filaments and fibers, adversely affects the dimensional stability of the resulting filaments and fibers to a considerable extent, especially under the conditions of the dyeing process. However, high dimensional stability under dyeing conditions is absolutely essential for numerous applications.

It has now been found that modacrylic filaments with improved coloristic properties and adequate dimensional stability can be obtained from acrylonitrile/vinyl chloride copolymers by spinning polymer mixtures of at least one acrylonitrile/vinyl chloride copolymer and a chlorine-containing copolymer which contains sulphonic acid groups or sulphuric acid ester groups.

Accordingly, the present invention relates to a wet-spun modacrylic filament with improved coloristic properties and adequate dimension stability under dyeing conditions based on a polymer mixture, which comprises at least one acrylonitrile-vinyl chloride copolymer and a chlorine-containing copolymer containing sulphonic acid groups or sulphuric acid ester groups.

The invention also relates to a process for the production of a wet-spun modacrylic filament with improved coloristic properties and adequate dimensional stability under dyeing conditions by spinning a polymer mixture, wherein said polymer mixture comprises at least one acrylonitrile-vinyl chloride copolymer and a copolymer containing chlorine and sulphonic acid groups or sulphuric acid ester groups.

At least one component ot his mixture is a copolymer of acrylonitrile and vinyl chloride containing generally from 30 to 70% by weight and preferably from 40 to 65% by weight of vinyl chloride. Products containing from 55 to 65% by weight of vinyl chloride are particularly suitable. In addition to the acrylonitrile-vinyl chloride copolymer, the polymer mixture, from which the modacrylic filaments according to the invention are obtained, contains as a component a linear chlorine-containing copolymer which contains sulphonic acid or sulphuric acid semiester groups which are either attached through main valences to the polymer chain by the incorporation of an appropriate comonomer or are introduced by a polymer-analogue reaction into a suitable polymer.

The copolymers which contain chlorine and sulphonic acid or sulphuric acid ester groups and with which a useful technical effect is obtained in accordance with the invention, are obtained for example by solution polymerisation at temperatures in the range of from 35° to 85° C in such solvents as dimethyl formamide, dimethyl acetamide or dimethyl sulphoxide. The copolymerisation reaction is generally carried out by polymerising the comonomers used in a concentration of from 20 to 40% in the presence of radical formers, such as azodiisobutyronitrile, or peroxides, such as benzoyl peroxide. Starter systems which have proved to be particularly effective for this solution polymerisation reactive are redox systems based on persulphate and oxalic acid or on persulphate and tetravalent compounds of sulphur. Other suitable starter systems are redox systems containing hydroperoxides, such as tert.-butyl hydroperoxide or $H_2O_2$, as the oxidising component, and sulphinic acids or amines as the reducing component.

The composition of the polymeric additive containing sulphonic acid groups or sulphuric acid ester groups is governed by various criteria.

Firstly, the fiber starting material, i.e. the acrylonitrile-vinyl chloride copolymer, must be compatible with the additive if homogeneous spinning solutions are to be obtained. Secondly, a minimum chlorine content is preferred in the polymeric additive in order to minimise the inflammability of the modacrylic filaments.

It has been found that, in cases where vinyl chloride or vinylidene chloride is used, favourable results are obtained with contents of from 10 to 40% by weight of the chlorine-containing comonomer. However, the dye-receptive copolymer preferably has copolymerised vinyl chloride or vinylidene chloride contents of from 15 to 35%.

A favourable technical effect in regard to compatibility is generally obtained when the sulphur content of these polymers amounts to at least 0.6% by weight. However, it is preferred to use polymers with a sulphur content of more than 1.0%. Particularly useful results are obtained in cases where, on the one hand, the mixture component has as a high sulphur content as possible and, on the other hand, is compatible with the other component(s) of the polymer mixture, so that useful spinning solutions can be obtained from the mixture. Results which satisfy commercial requirements are obtained in cases where the copolymers contain from 1.5 to 5% by weight of sulphur. In most cases, polymers or copolymers with higher sulphur contents are incompatible with vinyl chloride/acrylonitrile copolymers and are only suitable for use as polymeric dye-receptive additives in special cases.

In order to guarantee optimum compatibility of the polymeric dye-receptive additive with the fiber starting material, it is advantageous to use copolymers containing, as additional components, such compounds as acrylonitrile, acrylic acid esters, for example methyl acrylate and ethyl acrylate, acrylamides, for example acrylamide, N-methyl acrylamide, N-tert.-butyl acrylamide and N,N-dimethyl acrylamide, methacrylic acid esters such as, for example, methacrylic acid methyl and ethyl ester, methacrylic acid amides, for example methacrylamide, N-methyl methacrylamide and N,N-dimethyl methacrylamide, or vinyl esters, for example vinyl acetate and styrene. The polymeric dye-receptive additives are preferably used in the form of ternary copolymers of vinyl chloride and/or vinylidene chloride, acrylonitrile and a comonomer containing sulphonic acid or sulphuric acid semiester groups.

Suitable comonomers containing sulphonic acid or sulphuric acid ester groups are, for example, allyl sulphonic acid, methallyl sulphonic acid, styrene sulphonic acid, N-acryloyl taurine, N-methacryloyl taurine, N-acryloyl dimethyl taurine or N-methacryloyl dimethyl taurine, and also vinyl sulphonic acid and the sulphuric acid semiesters of allyl alcohol and of other ethylenically unsaturated compounds containing hydroxyl groups, such as the sulphuric acid semiester of ethylene glycol acrylate or ethylene glycol methacrylate.

The molecular weights of the polymeric dye-receptive additives may vary within wide limits and are not critical to the effect according to the invention. However, since the mutual compatibility of polymers in mixtures is in some cases governed by the molecular weights of the components of the mixture, it is necessary to co-ordinate the components with one another not only in regard to their sulphur content, but also in regard to their molecular weight. In general, suitable polymers are those with a molecular weight in the range of from 500 to 500,000. It is preferred to use copolymers with average molecular weights in the range of from 2000 to 200,000. In many cases, it has been found that copolymers with relatively high sulphur contents, for example 2% by weight, which are suitable for use as polymeric dye-receptive additives, are compatible with acrylonitrile-vinyl chloride copolymers when the polymeric dye-receptive additives have molecular weights in the range of from 1000 to 50,000. In many cases, the compatibility of the polymeric dye-receptive additive improves with decreasing molecular weight.

The improvement according to the invention in the coloristic properties of the modacrylic filaments is obtained by adding the dye-receptive additive to the fiber starting material in such quantities that the polymer mixture has a total sulphur content of from 0.1 to 1% by weight. In order to obtain even dye finishes with basic dyes, it is advantageous to adjust a sulphur content of from 0.2 to 0.8%. Sulphur contents of from 0.25 to 0.5% are particularly advantageous in regard to the fastness to light of the dye finishes.

The coloristic properties of modacrylic filaments and modacrylic fibers are generally defined by the fiber saturation value $S_F$ and by the rate of dye-absorption V as characteristics (as described in "Textilindustrie" 71, 9/1969, pages 603 – 608), where basic dyes are used for dyeing. High fiber saturation value represent a high concentration of dye acceptor groups in the fiber starting material. High absorption rates mean that the given acceptor groups are quickly saturated with dye molecules.

The modacrylic filaments according to the invention are evenly dyed deep colours with the usual basic dyes. Such shades as black or marine blue are obtained in favourable dyeing times without any need to use ecologically critical dyeing auxiliaries. It was surprising that, in the modacrylic filaments according to the invention, the fastness to light of the dye finishes should be considerably improved by comparison with modacrylic filaments of non-modified fiber material. By virtue of the process according to the invention, i.e. by combining a fiber starting material with a polymeric additive containing dye-receptive groups, i.e. a "polymeric dye-receptive additive", it is possible to obtain not only an improvement in the applicability of basic dyes, but also an improvement in the fastness to light of the dye finishes.

The filaments with the improved coloristic properties are obtained by wet-spinning solutions of the polymer mixtures. Whereas modacrylic filaments are normally obtained by spinning solutions of the starting materials in acetone, cyclohexanone or acetonitrile, the process according to the invention is more suitable for the production of modacrylic fibers and modacrylic filaments from solutions of the polymer mixtures in solvents of the type suitable for the production of acrylic filaments. Solvents of this kind are dimethyl formamide, dimethyl acetamide, dimethyl sulphoxide, ethylene glycol carbonate, hexamethyl phosphoric acid triamide, tetramethyl urea, and concentrated solutions of inorganic salts, for example sodium thiocyanate or zinc chloride, in water. Particularly favourable results are obtained by dissolving the polymer mixtures in dimethyl formamide or in dimethyl acetamide and spinning the resulting solutions by a wet-spinning process. The spinning solutions may be prepared either by dissolving the individual components and subsequently mixing the resulting solutions, or by dissolving the premixed components at room temperature and/or at elevated temperatures. Dissolution may be carried out continuously or in several stages in stirrer-equipped vessels or in dissolving screws. For example, the polymer and solvent may first be combined with one another in a mixing screw, and the actual spinning solution subsequently produced at elevated temperature either in a dissolving screw or in a stirrer-equipped vessel. In some cases, the spinning solutions have to be treated for a prolonged period at elevated temperatures. It is advantageous not to exceed temperatures above 100° C, although temperatures of 80° C are preferably not exceeded. Particularly favourable results are obtained where temperatures in the range of from 15° to 60° C are maintained during dissolution.

The concentration of polymer mixture in the spinning solutions is generally between 20 and 40% by weight. Depending on the average molecular weight of the components, favourable spinning results are obtained either with the fairly high or with the fairly low concentrations of the spinning solutions, although it is preferred to use spinning solutions with concentrations of from 30 to 35% by weight. The spinning solutions should have viscosities of from 100 to 2000 poises, preferably from 300 to 1000 poises, as measured at 20° C.

The spinning solution is transported from the dissolution units to the spinning units by means of metering pumps. Gear pumps whose output can be varied through infinitely variable gear systems have proved to be particularly suitable for this purpose. It may be advantageous to adjust all the transporting units, by means of secondary heating systems, to an adjustable temperature different from room temperature, for example in order not to exceed a certain total pressure in the pipe system. Temperatures in the range of from 20° to 50° C are preferred, the secondary heating system being adjustable to between 20° and 140° C. The spinning solution does not undergo degradation or gelation, even in the event of a prolonged residence time. This surprising effect is a particular advantage of the solvents used in accordance with the invention, dimethyl acetamide and dimethyl formamide, over the solvents normally used for dissolving halogen-containing copolymers, such as cyclohexanone, acetonitrile and acetone. As known from German Pat. Specification No. 962,472, a copolymer of 40% of acrylonitrile and 60% of vinyl chloride with a solids concentration of only 20% by weight in acetone gels after standing for only 4 days at room temperature. Even a terpolymer of 45% of acrylonitrile, 45% of vinyl chloride and 10% of vinyl acetate shows an increase in viscosity from 74 to 190 ball-drop seconds after standing for 24 hours at 20° C, i.e. a considerable tendency towards gelation. The distinct advantage of a spinning solution prepared by the process according to the invention in regard by gelling properties is shown in Table I.

Table I

| Standing time (at 35° C) (in hours) | Viscosity (poises/20° C) |
|---|---|
| 24 | 800 |
| 96 | 796 |
| 144 | 807 |
| 192 | 845 |
| 264 | 932 |
| 312 | 997 |
| 360 | 1055 |

The values quoted in Table I were measured on a 31% by weight solution in dimethyl formamide of a polymer mixture of a copolymer containing 39.8% by weight of acrylonitrile and 60.2% by weight of vinyl chloride and another copolymer of 47% by weight of acrylonitrile, 32% by weight of vinylidene chloride and 21% by weight of acryloyl dimethyl taurine in the form of its methyl ethanolamine salt, this last mixture component being added in a quantity of 8.5% by weight, based on the total quantity of polymer.

The solution is filtered in the usual way and may then be extruded through the spinneret into the precipitation bath. So-called cap dies with between 20 and 5000 bores of from 0.060 mm to 0.2 mm in diameter are used as the spinnerets. The precipitation bath is an aqueous solution of the solvent used for dissolving the polymer mixture. The water content fluctuates between 20% by volume and 80% by volume, although solutions containing from 40% by volume to 67.5% by volume of solvent in the precipitation bath are preferred. Filaments with the favourable properties described above may be obtained over a wide range of precipitation bath temperatures. For example, the temperature of the precipitation bath may amount to 60° C or to −10° C.

Particularly good results are obtained at a precipitation bath temperature of from 0° C to 25° C. The filaments are run off from the precipitation bath at the normal wet-spinning rate of from 5 to 20 m/minute through a washing bath where the solvent content of the partially coagulated filament is further reduced. In order to obtain adequate textile properties, the spun material has to be stretched in known manner. Water baths, which are heated to approximately 100° C by electricity or steam and in which rollers rotating at different speeds are present, are used for this purpose. The quotient of input and take-off speed gives the stretching ratio which may reach values of from 0.5 to 0.1. Stretching of the filaments may be carried out in two or more successive stages. The moist filament yarns are dried and, if required, crimped and cut. Dyeing with cationic dyes is carried out by known methods at an elevated temperature in aqueous solution. The quantity of dye taken up by the fibers may readily be determined by colorimetric measurement.

The following examples are to further illustrate the invention without limiting it.

EXAMPLES

A. Example of the production of a polymeric dye-receptive additive of acrylonitrile, vinylidene chloride and N-acryloyl dimethyl taurine.

The following solutions and mixtures are used:

| 1 | 4325 g of dimethyl formamide |
|---|---|
|   | 175 g of deionised water |

-continued

| II | 1000 g of dimethyl formamide |
| | 375 g of N-acryloyl dimethyl taurine (ADT) |
| | 132.5 g of 2-methylamino ethanol |
| III | 1250 g of acrylonitrile |
| | 875 g of vinylidene chloride |
| IV | 300 g of dimethyl formamide |
| | 6 g of ammonium peroxy disulphate |
| V | 300 g of dimethyl formamide |
| | 7 g of oxalic acid |

The DMF/water mixture (I) is initially introduced into a 10 liter glass reaction vessel, equipped with a reflux condenser cooled with ice water, a stirrer and a gas inlet pipe, followed by rinsing with nitrogen at 50° C. The ADT-ammonium salt solution (II) obtained by neutralisation at 0° C and the monomer mixture (III) are then combined with the DMF/water mixture (I). After a reaction temperature of 50° C has been adjusted, polymerisation is initiated by the addition of the initiator solutions (IV) and (V).

After 15 hours, a solids content of 24.0% by weight is reached in the solution, corresponding to a conversion of 75%. Following dilution with water, a polymer of the following composition is recovered from the polymer solution with a conversion of 75% by the addition of electrolyte:

47.0% by weight of acrylonitrile
32.0% by weight of vinylidene chloride
21.0% by weight of N-acryloyl dimethyl taurine (in the form of the ammonium salt of 2-methylamino ethanol) (ADT-salt)
K-value: 72
Yield: 1970 g EXAMPLE B (Comparison Example):

A copolymer which contains 43% by weight of acrylonitrile and 57% by weight of vinyl chloride and which has an intrinsic viscosity of 0.94 (as measured at 25° C in DMF), is dissolved in DMF at 40° C by means of a screw, so that a solids concentration of 34% by weight and a solution viscosity of 965 poises/20° C are obtained. The solution is extruded by a gear pump through a spinneret with 150 bores 0.1 mm in diameter into a precipitation bath with a temperature of 5° C consisting of water and dimethyl formamide in a ratio of 1:1. The filaments are run off at a rate of 12 meters per minute, washed at room temperature and streched by 400% in water at approximately 95° C, dried at 110° C and, after a permitted shrinkage of 25%, are wound into package form in a steam atmosphere at 130° C. Modacrylic filaments with the following textile values are obtained:

| Tensile strength | 2.31 p/dtex |
| Elongation at break: | 29% |

A fiber saturation value $S_F$ of 1.1 and an absorption rate V of 0.77 are obtained during dyeing with basic dyes.

EXAMPLE 1

The copolymer described in Example B is replaced in accordance with the invention by a mixture of a copolymer containing 43% by weight of acrylonitrile and 57% by weight of vinyl chloride, and the terpolymer of Example A, the mixing ratio of copolymer to terpolymer amounting to 91:9 by weight.

Spinning and aftertreatment were carried out in the same way as in Example B. The filament yarn was found to have the following textile values:

| Tensile strength: | 2.54 p/dtex |
| Elongation at break: | 27% |
| Fibre saturation value $S_F$: | 3.3 |
| Absorption rate V: | 3.4 |

EXAMPLE C (Comparison Example):

An acrylonitrile-vinyl chloride copolymer containing 60% by weight of vinyl chloride is processed over a period of 4 hours in a stirrer-equipped vessel to form a spinning solution with a viscosity of 620 poises at 20° C and a solids content of 31% by weight. The precipitation bath, into which the solution is extruded through a 1000-bore spinneret, has a temperature of 22° C and a dimethyl formamide content of 44% by volume. The spinning draft amounted to 0.72. After stretching by 320% in boiling water, the material was dried in air at 140° C.

The following textile values were determined:

| Tensile strength: | 2.0 p/dtex |
| Elongation at break: | 34% |
| Loop tenacity (rel): | 68% |
| Fibre saturation value $S_F$: | 1.05 |
| Absorption rate V: | 0.72 |

EXAMPLE 2

A polymeric dye-receptive additive of 48% by weight of acrylonitrile, 31.5% by weight of vinylidene chloride and 20.5% by weight of acryloyl dimethyl taurine (ADT-salt) is added to the acrylonitrile-vinyl chloride copolymer described in Comparison Example C, so that the polymer mixture contains 6% by weight of the polymeric dye-receptive additive. When the mixture is dissolved and spun in the same way as in Example B, modacrylic filaments with the following values are obtained:

| Tensile strength: | 1.87 p/dtex |
| Elongation at break: | 35% |
| Loop tenacity (rel): | 67% |
| Fibre saturation value $S_F$: | 1.8 |
| Absorption rate V: | 2.3 |

EXAMPLE D (Comparison Example)

A copolymer of 42.4% by weight of acrylonitrile and 57.6% by weight of vinyl chloride is dissolved in DMF at 45° C in a stirrer-equipped vessel, so that a solids concentration of 31% by weight is obtained. The solution has a viscosity of 760 poises at 20° C. A filament yarn is produced from this solution by the process according to the invention by extruding the solution through a 1000-bore spinneret into a bath of 55% by volume of DMF and 45% by volume of $H_2O$ with a temperature of 7° C, and running off the spun material formed from the coagulation bath at a rate of 12 meters per minute. After washing at room temperature for 18 seconds, the filament yarn is stretched by 450% in boiling water and left to dry under tension in air at a temperature of 80° C.

A fiber saturation value $S_F$ of 1.2 and an absorption rate of 0.7 are obtained during dyeing with basic dyes.

EXAMPLE 3

In accordance with the invention, a polymeric dye-receptive additive consisting of
- 48% by weight of methyl acrylate
- 34% by weight of vinylidene chloride
- 18% by weight of ADT-salt
- K-value 57 is added to the copolymer of acrylonitrile-vinyl chloride described in Example D in such a quantity that the ratio by weight of the copolymer to the polymeric additive amounts to 93:7.

When filaments are produced from this polymer mixture by the process according to the invention (as described in Example D), the following values are obtained under the same dyeing conditions as in Example D:

$S_F = 3.9$
$V = 1.8$.

EXAMPLE 4

A mixture of 93% by weight of the copolymer described in Example D and 7% by weight of a ternary, dye-receptive component of
- 50% by weight of N-tert.-butyl acrylic acid amide
- 33% by weight of vinylidene chloride
- 17% by weight of ADT-salt
- K-value 50 is processed into filament yarn in the same way as described in Example D and then dyed with basic dyes.

$S_F = 3.6$
$V = 2.2$

EXAMPLE 5

Comparison of the light-fastness values with and without a dye-receptive additive A copolymer of 60% by weight of vinyl chloride and 40% by weight of acylonitrile was mixed with 10% by weight, based on the polymer mixture, of an additive consisting of 48% by weight of acrylonitrile, 31.5% by weight of vinylidene chloride and 20,5% by weight of ADT-salt, and the resulting mixture was spun as in Example B into filaments which were dyed, on the one hand, with a yellow dye of the formula:

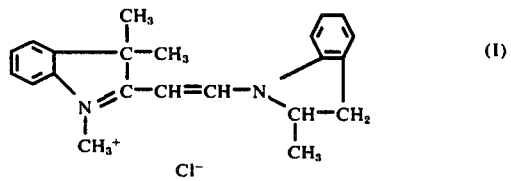

and, on the other hand, with a red dye of the formula:

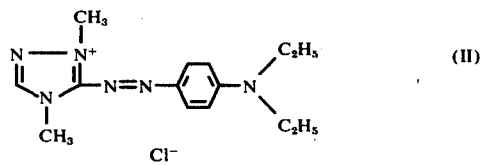

In a comparison test, filaments were similarly spun from the above-mentioned copolymer, but without the additive, and dyed.

The light fastness values are shown in Table II:

Table II

| Dye | Fastness to light according to the invention | comparison |
| --- | --- | --- |
| I | >6 | 6 |
| II | >6 | 5 |

The light-fastness test was carried out in artificial daylight in accordance with DIN 54004 which stipulates the light fastness requirements of dye finishes and prints.

What we claim is:
1. A wet-spun modacrylic filament with improved coloristic properties and adequate dimension stability under dyeing conditions based on a polymer mixture, which comprises at least one acrylonitrile-vinyl chloride copolymer and a chlorine-containing copolymer containing sulphonic acid groups or sulphuric acid ester groups.

2. The filament of claim 1, wherein said acrylonitrile vinyl chloride copolymer consists of from 30 to 70% of vinyl chloride.

3. The filament of claim 1, wherein said copolymer containing chlorine and sulphonic acid groups or sulphuric acid ester groups has a sulphur content of from 0.6 to 5% by weight.

4. The filament of claim 1, wherein said copolymer containing chlorine and sulphonic acid groups or sulphuric acid ester groups has a chlorine content of from 10 to 30% by weight.

5. The filament of claim 1, having a total sulphur content of from 0.1 to 1% by weight.

* * * * *